US012808369B2

(12) United States Patent
Herden et al.

(10) Patent No.: US 12,808,369 B2
(45) Date of Patent: Nov. 24, 2026

(54) AIR SUPPLY SYSTEM AND METHOD FOR CONTROLLING AND/OR MONITORING AN AIR SUPPLY SYSTEM

(71) Applicant: KNORR-BREMSE SYSTEME FÜR SCHIENENFAHRZEUGE GMBH, Munich (DE)

(72) Inventors: Marc-Oliver Herden, Munich (DE); Thomas Kipp, Munich (DE); Thomas Merkel, Hürth (DE); Martin Schmid, Munich (DE)

(73) Assignee: KNORR-BREMSE SYSTEME FÜR SCHIENENFAHRZEUGE GMBH (DE)

( * ) Notice: Subject to any disclaimer, the term of this patent is extended or adjusted under 35 U.S.C. 154(b) by 547 days.

(21) Appl. No.: 17/433,993

(22) PCT Filed: Jan. 29, 2020

(86) PCT No.: PCT/EP2020/052151
§ 371 (c)(1),
(2) Date: Aug. 25, 2021

(87) PCT Pub. No.: WO2020/173649
PCT Pub. Date: Sep. 3, 2020

(65) Prior Publication Data

US 2022/0135092 A1 May 5, 2022

(30) Foreign Application Priority Data

Feb. 25, 2019 (DE) ..................... 10 2019 104 760.9

(51) Int. Cl.
*F04B 41/00* (2006.01)
*B60T 17/02* (2006.01)
*F04B 49/06* (2006.01)

(52) U.S. Cl.
CPC .............. *F04B 41/00* (2013.01); *B60T 17/02* (2013.01); *F04B 49/06* (2013.01)

(58) Field of Classification Search
CPC .......... B16L 3/006; B60T 17/02; H02P 27/04; H02P 27/06; B60R 16/02; B60R 16/023
(Continued)

(56) References Cited

U.S. PATENT DOCUMENTS

2002/0187048 A1* 12/2002 Meier .................... B60G 13/14 417/32
2003/0077179 A1* 4/2003 Collins ................. F04B 49/065 417/63
(Continued)

FOREIGN PATENT DOCUMENTS

DE 19835638 A1 2/2000
DE 102013101502 A1 8/2014
(Continued)

OTHER PUBLICATIONS

International Search Report and Written Opinion corresponding to PCT/EP2020/052151 dated Jun. 5, 2020.

*Primary Examiner* — Kenneth J Hansen
(74) *Attorney, Agent, or Firm* — Barnes & Thornburg LLP

(57) ABSTRACT

An air supply system for a rail vehicle that includes electrical consumers, such as a compressor, an air dryer, a valve or the like, and a converter coupled to a power supply of the rail vehicle, wherein the air supply system adjusts the voltage provided by the power supply to an operating voltage of at least one electrical consumer, wherein the converter is associated with at least two of the plurality of electrical consumers in such a way that the converter can
(Continued)

control, particularly in a closed-loop manner, and/or monitor the operation of the at least two of the plurality of electronic consumers.

19 Claims, 2 Drawing Sheets

(58) Field of Classification Search
USPC ........................ 307/11, 17, 18; 417/2, 18–29
See application file for complete search history.

(56) References Cited

U.S. PATENT DOCUMENTS

| | | | | |
|---|---|---|---|---|
| 2013/0071260 | A1 | 3/2013 | Worden et al. | |
| 2015/0369235 | A1 * | 12/2015 | Hartl | B60T 17/002 417/415 |
| 2016/0337075 | A1 | 11/2016 | Mohamad et al. | |
| 2017/0002804 | A1 * | 1/2017 | Kipp | F04B 41/02 |
| 2017/0207733 | A1 * | 7/2017 | Matsuyama | F04B 39/0207 |

FOREIGN PATENT DOCUMENTS

| | | | | |
|---|---|---|---|---|
| DE | 102016117327 | A1 | 3/2018 | |
| EP | 3093206 | A1 | 11/2016 | |
| JP | 2004336958 | A | 11/2004 | |
| JP | 2014047652 | A | 3/2014 | |
| JP | 2016539227 | A | 12/2016 | |
| KR | 20150118175 | A | 10/2015 | |
| WO | WO-2017029427 | A1 * | 2/2017 | F04B 41/06 |
| WO | 2018105711 | A1 | 6/2018 | |

* cited by examiner

AIR SUPPLY SYSTEM AND METHOD FOR CONTROLLING AND/OR MONITORING AN AIR SUPPLY SYSTEM

CROSS REFERENCE AND PRIORITY CLAIM

This patent application is a U.S. National Phase of International Patent Application No. PCT/EP2020/052151 filed Jan. 29, 2020, which claims priority to German Patent Application No. 10 2019 104 760.9, the disclosure of which being incorporated herein by reference in their entireties.

FIELD

The disclosed embodiments relate to an air supply system for a rail vehicle. Disclosed embodiments furthermore relates to a method for controlling and/or monitoring an air supply system.

The field of the disclosed embodiments extends primarily to rail vehicles. However, it is also conceivable to use the air supply system in utility vehicles in order to maintain a pneumatic circuit there.

BACKGROUND

Air supply systems in rail vehicles generally serve to provide a defined quantity and quality of compressed air, for example for actuating brakes, opening and closing doors and for supplying the air suspension system. Air supply systems comprise multiple components, for example a compressor for compressing air, an air treatment device for purifying the air or for removing water, dirt and/or oil components from the air, these possibly impairing the operation of pneumatic consumers, and multiple valves for controlling airflow.

SUMMARY

Disclosed embodiments provide an efficient air supply system, the operation of which is able to be controlled, in particular regulated, and/or monitored, optionally in an operating state-dependent manner.

BRIEF DESCRIPTION OF THE FIGURES

Properties, features and advantages of the disclosed embodiments will become clear below through the description of disclosed embodiments with reference to the accompanying exemplary drawings, in which.

DETAILED DESCRIPTION

Figure 1:
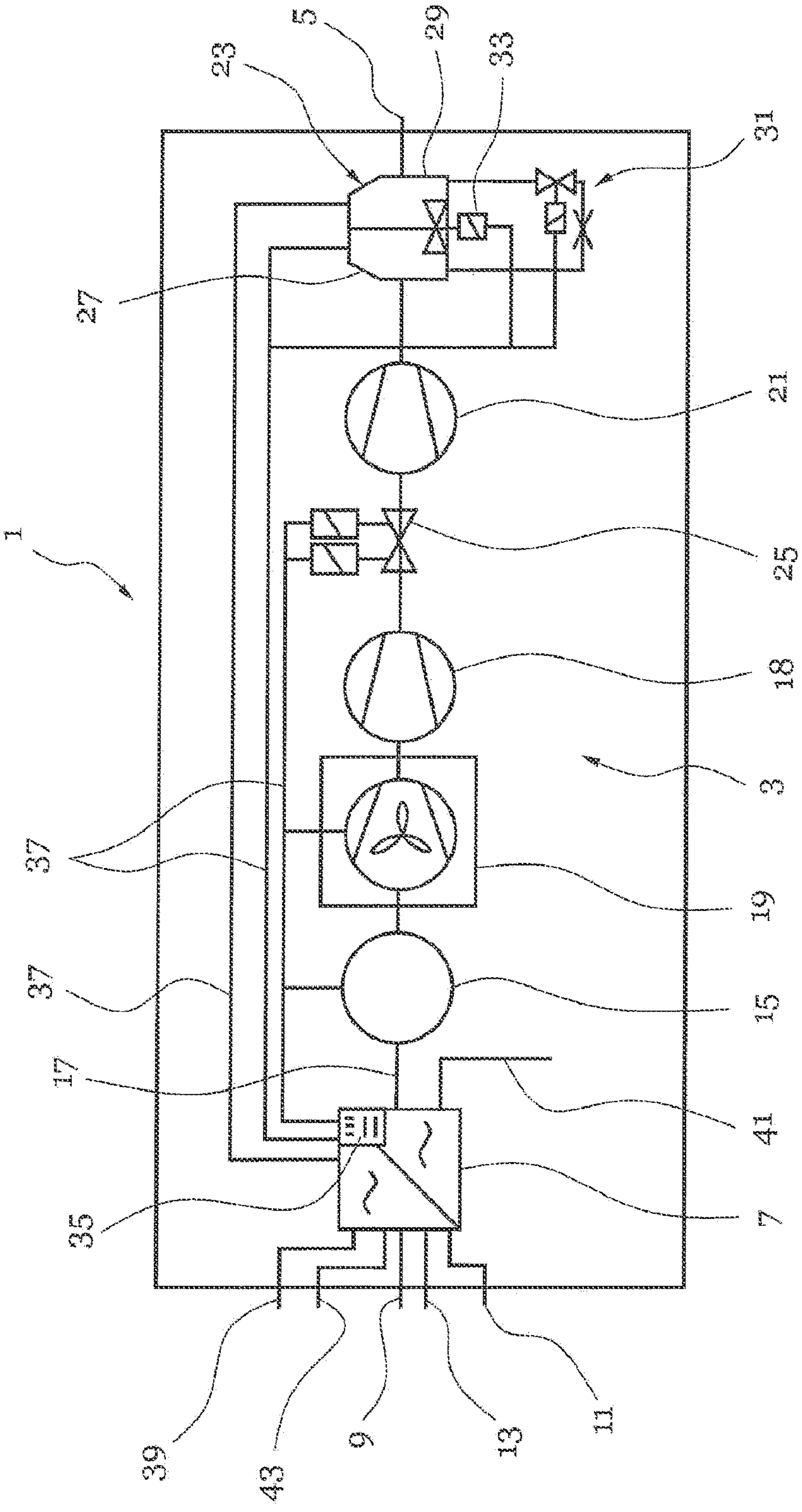
FIG. 1 shows a section of a schematic block diagram of an air supply system for a rail vehicle.

It is known to supply power to the components, which may be referred to as consumers, of the air supply system by way of an auxiliary converter. The auxiliary converter in this case ensures that the voltage applied to the power supply of the rail vehicle is matched to the required input voltage of the respective consumer. Air supply systems in rail vehicles are subject to diverse, sometimes conflicting requirements, which may vary depending on the operating state or situation of the rail vehicle or the air supply system. Using the compressor as an example, this means for example that high supply performance, sufficient switch-on times, low noise emissions, low energy consumption, a small installation space and low costs are all required at the same time. The prior art does not disclose controlling the consumers of the air supply system in a demand-based manner, that is to say based on the respective operating state.

EP 2 956 341 B1 teaches an electronic converter that is assigned to a motor of a compressor for generating compressed air for demand-dependent compressor control. In order to monitor and control the compressor, use is made of sensors for generating electrical signals. The electrical signals generated by the sensors are evaluated and control commands are derived by way of software stored in a central controller. The system according to EP 2 956 341 B1 accordingly requires additional electronic interfaces and components for processing the electronic signals. The system is also limited to use for compressor control purposes. Other components/consumers are not able to be controlled.

An apparatus and a method for monitoring the operation of the air supply system are disclosed for example in EP 3 093 206 B1. The apparatus comprises a sensor system for measuring operating data of the air supply system as well as an interface for receiving the measured data, an evaluation device for evaluating the received measured data, a communication interface and a stationary evaluation unit for further processing the evaluated information in a stationary manner Vehicle-specific data may be read via an additional data interface to a vehicle controller of the rail vehicle and provided via the communication interface. The power for switching the air supply system components on and off is supplied via a separate electronic circuit having an additional central unit and additional power supply lines. The apparatus according to EP 3 093 206 B1 significantly increased the complexity of the electronics and the number of required electronic components and interfaces, making the apparatus susceptible to errors.

Presently disclosed embodiments improve the disadvantages from the known prior art, in particular to provide an efficient air supply system, the operation of which is able to be controlled, in particular regulated, and/or monitored, optionally in an operating state-dependent manner.

According thereto, what is provided is an air supply system for a rail vehicle or for a utility vehicle. The air supply system according to the disclosed embodiments generally serves to provide a defined quantity and quality of compressed air, for example for actuating brakes, opening and closing doors and for supplying the air suspension system. The air supply system comprises a group of multiple electrical consumers, each of which perform different functions of the air supply system, in particular along a flow of compressed air. By way of example, the air supply system comprises a compressor, optionally for compressing air, an air treatment device for purifying the air or for removing water, dirt and/or oil components from the air, these possibly impairing the operation of electrical and pneumatic consumers, one or more valves for controlling airflow and/or an air dryer for drying and/or dehumidifying the air. The air supply system may be constructed such that the group of multiple electrical consumers are connected in series along the flow of air. It is clear that at least two of the group of multiple electrical consumers may also be connected in parallel with one another in sections along the airflow.

The air supply system furthermore comprises a converter coupled to a power supply of the rail vehicle, in particular an auxiliary converter of the rail vehicle or of the utility vehicle. The converter may for example be configured as a frequency and/or AC current converter and be configured so as to generate, from an AC voltage, an AC voltage of different frequency and/or amplitude. The converter may for example have a topology that is known in the prior art and/or be implemented in a known manner in order to convert the AC voltage in terms of amplitude and/or frequency. The converter is intended to match the voltage and/or frequency provided by the power supply to an operating voltage and/or operating frequency of at least one electrical consumer, by way of which the electrical consumer is to be operated, of the group of multiple electrical consumers.

According to one exemplary embodiment, the converter matches the voltage and/or frequency provided by the power supply to the operating voltage and/or operating frequency at least, in particular exclusively, of the compressor. The converter may for example forward, such as connect through, the voltage and/or frequency provided by the power supply to the other electrical consumers of the group of multiple electrical consumers, with interposition for example of an electric current-operated, in particular electromagnetic switch, such as a relay, for activating and deactivating the corresponding electrical consumer or a solenoid valve for flexibly controlling the operation of the corresponding electrical consumer. By way of example, the converter may have at least one power output, by way of which the converter is connected to the at least one electrical consumer in order to operate it with the corresponding operating voltage and/or operating frequency. The converter may furthermore have a large number of control outputs, wherein the converter is coupled to a respective one of the groups of multiple electrical consumers via a respective control output, in particular in order to operate the respective electrical consumer.

According to a first aspect of the disclosed embodiments, the converter is assigned to at least two, optionally all, of the group of multiple consumers such that the converter is able to control, in particular regulate, and/or monitor the operation of the at least two of the group of multiple consumers. By virtue of the fact that the converter is assigned to at least two, optionally all, of the group of electrical consumers in terms control and/or monitoring, it is possible to reduce or save on additional electronic controllers and electronic interfaces, which were necessary in the prior art to link the various electronic circuits. This is reinforced by the fact that the converter forms a functional union for control, optionally regulation, and/or monitoring purposes, such that the converter also serves as central electronics for monitoring, maintaining and diagnosing the operation of the converter or the air supply system, in particular the at least two, optionally all, of the group of multiple electrical consumers.

Operation of an electrical consumer should be understood to mean the switching on and switching off or the switched-on and switched-off state or an operating mode of the electrical consumer in which it is able to be operated and which is able to be varied, wherein an operating mode should be understood for example to mean emergency operation, full-load operation, partial-load operation and all intermediate operating stages that are able to be set by way of the converter in order to control optimized operation of the air supply system with regard to an operating point, such as noise emission, compressor temperature, consumption of regeneration air in the air dryer, compressor wear or oil emulsification.

The converter accordingly forms central intelligence for the air supply system, which makes it possible to influence the operation of at least two, optionally all, of the group of multiple consumers in order to optimize the operation of the air supply system and/or to monitor, optionally diagnose, the operation or the operating state of the at least two, in particular all, of the group of multiple electrical consumers.

The converter may furthermore be configured and/or assigned to the at least two of the group of electrical consumers such that it is able to influence the operation of the at least two of the group of multiple electrical consumers in a targeted manner along a controlled system, which is defined in particular by the airflow, in order to set a desired, in particular predefined operation, and/or operation corresponding to a control specification from superordinate electronics, of the at least two electrical consumers and/or of the air supply system.

In one exemplary embodiment, the converter has electronics that are configured so as to convert the voltage and/or frequency provided by the power supply to the operating voltage and/or operating frequency of the at least one electrical consumer. The electronics may be configured so as to generate electrical signals in terms of information, to manage electrical energy, and/or the electronics may be built on a circuit board, in particular in order to implement an electronic application. As an alternative or in addition, the converter may be connected to the at least two of the group of multiple electrical consumers in terms of signal transmission such that the electronics are able to control the operation thereof. Provision may be made for the electronics to control the operation of the at least two of the group of multiple electrical consumers based on control algorithms stored in the electronics. As an alternative or in addition, the converter electronics may receive control signals from superordinate electronics, such as a vehicle controller or a brake controller, based on which control signals the at least two of the group of electrical consumers are to be controlled. The converter may for example have multiple operating modes based on which the at least two of the group of electrical consumers are able to be controlled. By way of example, the converter may receive a optionally digital 3-bit control signal from the superordinate electronics, which defines the corresponding operating mode of the converter. The converter may be configured so as to control the at least two of the group of electrical consumers in accordance with the operating mode defined by the superordinate electronics. By way of example, a distinction is drawn between a standard operating mode and an auxiliary operating mode, which differ in terms of a different input voltage and/or input frequency.

According to one development, the converter operates a compressor of a motor of the air supply system in accordance with the operating mode, for example in full-load operation, part-load operation or auxiliary operation. The converter may furthermore be configured so as to control the operation of at least one further, optionally all, of the group of electrical consumers of the air supply system based on the respective speed of the compressor. According to one exemplary embodiment, the converter may be connected to the at least two of the group of multiple consumers in terms of signal transmission such that the electronics are able to regulate the operation of the at least two of the group of multiple electrical consumers based on control algorithms stored in the electronics and/or based on control signals received from superordinate electronics, such as a vehicle controller or a brake controller. In contrast to control, in the case of regulation, a variable to be influenced, the controlled variable, is ascertained in a controlled system, defined in particular by the airflow, and the controlled variable is optionally continuously compared and/or matched to a desired value, optionally setpoint value.

According to a further exemplary embodiment, the electronics are connected to the at least two of the group of multiple electronic consumers in terms of signal transmission such that the electronics are able to monitor the operation of the at least two of the group of multiple electrical consumers based on evaluation algorithms stored in the electronics, optionally in order to be able to make statements about their operation, to be able to initiate maintenance measures if necessary and/or to adapt the operation of the respective electrical consumer of the group of multiple electrical consumers.

In one exemplary embodiment of the air supply system, at least one sensor for ascertaining an air-specific measured variable and/or a consumer-specific measured variable and/or an operating parameter of the converter is connected to the converter in terms of signal transmission. An air-specific measured variable may be for example temperature, pressure, air humidity or the like. A consumer-specific measured variable may be for example the number of operating hours, a temperature value, a wear value, an input or output power. It is clear that the sensor does not have to measure the specified measured variables directly, but rather provision may be made for example for the converter, in particular the converter electronics, to determine, in particular calculate, the respective measured variable indirectly, optionally calculate it based on a further measured variable.

By way of example, the converter, in particular the converter electronics, may be configured so as to ascertain and/or to monitor a pressure gradient at the compressor of the air supply system. The converter is furthermore configured so as to determine a degree of wear of the compressor based on the profile of the pressure gradient. By way of example, the degree of wear of the compressor increases as the pressure gradient becomes increasingly flat. The sensor may furthermore be configured so as to ascertain an oil temperature of a compressor lubrication system.

By way of example, the converter voltage or the temperature may be identified as operating parameters. According to one development, the at least one sensor is arranged and/or assigned to at least one of the group of multiple consumers such that the sensor is able to ascertain the air-specific measured variable and/or the consumer-specific measured variable. Pressure sensors, temperature sensors, differential pressure sensors and/or temperature differential sensors may be used as exemplary sensors. The converter, optionally its electronics, may be configured so as to control, in particular to regulate, and/or to monitor the operation of the at least two of the group of electrical consumers based on the ascertained measured variable/measured variables.

According to one exemplary embodiment, the at least one sensor is configured to measure a pressure value of a compressor, a pressure value of an upstream input filter of the compressor, a pressure value of an air dryer, a temperature of the air dryer or of the compressor and/or a degree of pollution of the air.

By way of example, the upstream input pressure and/or the downstream output pressure of the respective electrical or pneumatic consumer, as well as a differential pressure value, may be measured as pressure value. In the case of the air dryer, the sensor may be configured so as to measure a reservoir pressure.

By way of example, the air dryer is configured as an absorption regeneration dryer with two dryer reservoirs. These are configured such that one air reservoir carries out a drying process on the air arranged therein, while the other air reservoir performs a regeneration cycle before it is able to be used again for air-drying purposes. As soon as the regeneration cycle has ended, a valve is used for example to switch between the two air reservoirs such that the air reservoir that was previously involved in the drying process is regenerated and the previously regenerating air reservoir is used for air-drying purposes.

Provision may furthermore be made to determine a cooling air temperature or an ambient temperature at the air supply system in order to ascertain undesired, harmful heat generation. It may furthermore be advantageous to monitor, in particular to measure, the generated and conveyed compressed air in order to identify, in particular to measure, its composition, in particular the presence of foreign particles such as oil particles.

The following examples are intended to illustrate the functionality of the control, in particular regulation, and/or monitoring of the air supply system by the converter. By way of example, a pressure sensor may be assigned to the compressor. If the compressor receives a start control signal from the converter, but the pressure sensor does not detect any, optionally no significant, change in pressure, in particular in comparison with the initial setting or the non-actuated state, the converter may identify faulty operation of the compressor. The at least one sensor may furthermore be assigned to the air dryer, and in particular to its air reservoirs, in order to ascertain their pressure value. The converter is configured so as to compare the one or more ascertained pressure values with one another and/or with predefined, expected pressure values for the respective operating state and to identify a faulty operating state of the air dryer if a deviation is present, in particular a deviation that exceeds more than a tolerance. The converter may be configured so as to monitor a cooling state of the air supply system by monitoring the cooling air temperature and/or the ambient temperature. The sensor may in this case determine a temperature difference between a compressor input or the ambient air and a compressor output, based on which the converter is able to monitor the cooling state of the compressor, in particular of the air supply system.

By way of example, the converter is configured so as to establish a faulty operating state of the compressor if the ascertained temperature difference is excessively high. The at least one sensor may furthermore determine a pressure difference at the input side and at the output side of an input filter of the compressor.

By way of example, the converter is configured so as to compare the ascertained differential pressure with a limit value, based on which the converter is able to establish whether the input filter is defective, in particular blocked. The converter may furthermore be configured so as to identify whether the input filter exhibits a degree of saturation/wear based on the differential pressure at the input side and at the output side of the input filter and, if necessary, to initiate maintenance measures. In a further example, the at least one sensor may ascertain the compressed air temperature and the at least one converter may control, in particular regulate, and/or optimize the operating cycle of the air dryer.

By way of example, the converter may be configured so as to analyze an air output capacity of the compressor based on a pressure gradient of the compressor and/or of the air dryer in order also to determine for example wear and/or efficiency of the compressor.

In one exemplary embodiment of the air supply system, the converter, optionally its electronics, is configured to control, optionally to regulate, the operation of the heater, in particular its subcomponents, based on temperature values ascertained by the at least one sensor and/or a time specification and/or a heating time of at least one heater of the air dryer. By way of example, the converter may control the heater of the air dryer in accordance with a time specification, wherein the time specification may be for example a specific time and/or be implemented by certain clocking. The converter, optionally its electronics, may furthermore be configured to control, optionally to regulate, a venting device for venting the compressor and/or an idling device for operating the compressor in idling mode based on a pressure value, optionally an upstream and downstream differential pressure value, of the compressor. By way of example, it may be advantageous to monitor and/or to control the operation of the heater in order to avoid freezing of optionally sensitive components/electrical consumers, in particular of the air dryer, in particular at outside temperatures below 0° C. By way of example, the at least one sensor may be configured as a thermistor, such as an NTC resistor or NTC thermistor, which generally constitutes a temperature-dependent resistor that switches on at a certain resistance value, optionally is actuated by the converter such that the heater is switched on. The heater is deactivated in the same way at a particular further resistance value. By way of example, provision may be made for temperature hysteresis between the switch-on and switch-off value of the heater, in particular in order to avoid continuous switching on and off. The idling device may be assigned to the compressor such that, in the event of faulty and/or excessively short operation, the compressor is switched to idling mode or compressed air is vented externally, such that the operating time of the compressor is artificially extended in order to avoid unfavorable operating states, for example excessively cool operation due to short operating times.

According to one exemplary embodiment, the converter, optionally its electronics, has an input interface for receiving the measured variable from the at least one sensor. By way of example, the interface and the at least one sensor may be configured for wireless signal transmission. The converter may furthermore have a storage unit for storing the received measured variable. By way of example, it is envisaged for the converter to evaluate sensor data and store predetermined characteristic values, such as for example a number of switch-on operations, an average operating time, an operating time at predetermined temperatures or the like. The storage unit may furthermore store relevant process data, such as for example one or more operating modes, operating times, sensor data and converter operating data. By way of example, in the event of failure or malfunction for example of the compressor, the abovementioned data may be retrieved from the storage unit and used to analyze the origin of the failure or malfunction.

According to one exemplary embodiment of the air supply unit, the converter, optionally its electronics, is configured to monitor an operating state of the air supply system, in particular of at least one consumer of the group of multiple consumers, based on the received measured variable. The converter is in particular configured to control, in particular to regulate, operation of the air supply system, in particular of at least one consumer of the group of multiple electrical consumers, based on the received measured variable. The operation of the air supply system or of the at least one, optionally all of the, electrical consumer(s) of the group of multiple electrical consumers may optionally be regulated based on the received measured variables.

By virtue of the fact that the converter electronics are assigned to the entire air supply system, in particular to all of the group of multiple electrical consumers, as central, intelligent electronics, and perform control, regulation and monitoring functions, it is possible to partially or fully dispense with additional electronic components, such as controllers and/or interfaces. In comparison with known air supply systems, the converter is no longer responsible only for generating/converting the operating voltage and/or operating frequency for at least one of the group of electrical consumers of the air supply system, but rather performs control, regulation and/or monitoring functions during operation of the air supply system. The converter optionally receives the information about the operation of the air supply system and required for regulation and/or monitoring purposes via the integrated at least one sensor. Based on these data, the converter, as the central intelligence of the air supply system, is able to control, in particular regulate, its operation in a demand-dependent and/or operating point-dependent manner, as well as initiate maintenance measures and perform diagnostic measures, that is to say monitor them.

In a further exemplary embodiment of the air supply system, the converter has a diagnostic device for monitoring the at least one operating parameter of the converter. The diagnostic device may be equipped with suitable software. Based on the at least one converter operating parameter, the converter is able to monitor the operating state of the air supply system, in particular of at least one consumer, and/or vary the operation of the converter, in particular in order to adapt the at least one operating parameter. The present inventors have found, for example, that the operating parameters of the converter may be used to conclude as to an operating state of the air supply system. If the converter then recognizes faulty operation of the air supply system based on the at least one operating parameter, the converter is able to act on the operation of the air supply system by varying its control output values in order to adapt the operating parameters, optionally to a setpoint operating parameter stored in the storage unit.

According to one exemplary embodiment, the converter is configured so as to control, in particular to regulate, the operation of an air dryer of the air supply system based on the compressor speed and/or ambient temperature and/or residual humidity of the air downstream of the air dryer. The converter is optionally configured so as to control, optionally to regulate, the operation of the air dryer based on the compressor speed such that a regeneration air loss of the air dryer is minimized and/or optimized. The present inventors have found that the functionality and/or the operation of the compressor are able to be monitored via the compressor speed, which is intended in particular to achieve a optionally predetermined setpoint value depending on the respective operating mode. This may be achieved for example without the presence of a sensor. The at least one sensor may furthermore be configured to detect a speed of a compressor of the air supply system.

In one exemplary embodiment, the storage unit stores setpoint variables for a setpoint operating state of the air supply system, in particular for a setpoint operating state of at least one consumer. By way of example, the storage unit may store setpoint variables for the individual electrical consumers of the group of multiple electrical consumers for each of the intended operating modes of the air supply system or the converter. By way of example, provision may be made for a setpoint variable, optionally of the at least one electrical consumer of the group of multiple electrical consumers, to be assigned to a respective measured variable. The converter may therefore be able to perform an extensive and/or consumer-specific diagnosis of the operation of the respective electrical consumer. According to one development, the evaluation unit is configured so as to compare the received measured variable with a setpoint variable assigned thereto for a setpoint operating state of the air supply system, in particular for a setpoint operating state of at least one electrical consumer of the group of multiple electrical consumers. Through the comparison, the converter is able to perform meaningful and/or consumer-specific monitoring/diagnosis of the respective operating state. The converter may furthermore adapt the operation of the air supply system, in particular of the at least one electrical consumer, based on the comparison/diagnosis, for example through suitable control/regulation interventions.

According to one exemplary embodiment, the converter, in particular the evaluation unit, is configured to identify a faulty operating state of the air supply system, in particular of at least one electrical consumer of the group of multiple electrical consumers, of the air supply system based on the comparison of the received measured variable with the setpoint variable assigned thereto when the received measured variable deviates from the setpoint variable assigned thereto. A optionally predefined tolerance deviation may in particular be defined, such that a faulty operating state is recognized only if the deviation exceeds the tolerance deviation. By way of example, all of the comparison data may be stored in the storage unit and/or provided to superordinate electronics. The converter optionally performs the setpoint/actual comparison continuously, in accordance with a certain predetermined clocking and/or in accordance with a time specification. Provision may furthermore be made for the at least one sensor to trigger the performance of a target/actual comparison by the converter when a particular measured value is ascertained.

In one exemplary embodiment, the converter is configured to adapt the operation of the air supply system, in particular of the at least one of the group of multiple electrical consumers, based on the received measured variable, in particular based on the comparison between received measured variable and setpoint variable assigned thereto, optionally in the event of a faulty operating state of the air supply system, in particular of at least one of the group of multiple electrical consumers. On account of the operation of the air supply system being monitored, the converter receives the process-relevant measured data. On this basis, the converter may for example be configured so as to act on the operation of the air supply system in order to avoid damage to the electrical consumers and their components and, if necessary, to re-establish a setpoint operating state of the air supply system, in particular of at least one of the group of electrical consumers. By way of example, the converter may switch to emergency operation, deactivate or provide warning signals to superordinate electronics, and initiate maintenance measures itself. In one exemplary embodiment of the air supply system, the converter has a communication interface that is configured to be read by a separate readout device and/or optionally to communicate wirelessly with superordinate electronics, such as a vehicle controller, a brake controller and/or a stationary data processing device. By way of example, the communication interface may also be configured as a diagnostic interface, in which case, in comparison with the communication interface, which is able for example to continuously transmit data by way of a data transmission system such as a bus, provides data on a single track, that is to say in one direction. The transmission may take place for example based on mobile communications technology and/or a wireless Internet protocol, wherein the communication takes place for example using cell phone masts in the surroundings of the rail vehicle. As an alternative or in addition, communication/data transmission may also take place via data cables.

In one exemplary embodiment ntion, the converter is configured to generate an analog control signal for controlling, in particular regulating, at least one of the group of multiple electrical consumers. By way of example, the analog control signal may be in the range from 4 to 20 mA. According to one development, a fan or blower for generating cooling air for the air supply system is controlled, in particular regulated, via the analog control signal.

According to one exemplary embodiment, the converter is connected directly to a contact line, such as a third rail or an overhead line, of the power supply in order to supply power thereto. However, it is also conceivable for an auxiliary converter, which generally serves to supply electrical energy to auxiliary units, such as an air press, a fan, and oil and water coolers, to be interposed between the contact line and the converter. If an auxiliary converter is present, the converter receives a smoothed, adjusted voltage and/or frequency from the auxiliary converter.

In a further exemplary embodiment of the air supply system, the converter is connected to an additional electrical energy source, such as a battery or an accumulator, by way of which it is possible to operate the air supply system, in particular in the event of failure of the power supply, in particular of the main power supply, this being implemented, as described above, via a contact line or via an auxiliary converter. By way of example, the operation by way of the electrical energy source may be intended to operate the compressor only via the energy source power in order to fill up the pneumatic circuit of the pantograph. The circuit of the pantograph is generally pneumatically separated from the rest of the pneumatic system of the rail vehicle, in particular by way of a check valve. By way of example, a maximum operating pressure may be 8 bar, in particular in order to avoid the compressor overheating, the converter overheating, the energy source being emptied or the air dryer being overloaded.

According to a further aspect of the disclosed embodiments, which may be combined with the preceding aspects and exemplary embodiments, what is provided is a method for regulating and/or monitoring an air supply system with a group of multiple electrical consumers, such as a compressor, an air dryer, a valve or the like, and a converter coupled to a power supply of a rail vehicle for matching the voltage and/or frequency provided by the power supply to an operating voltage and/or operating frequency of at least one electrical consumer of the group of multiple electrical consumers, with which the electrical consumer is to be operated, of a rail vehicle. In the method, power is provided to the air supply system. An operating voltage and/or an operating frequency of at least one electrical consumer of the group of multiple electrical consumers are/is furthermore generated from the power supply by way of the converter. According to this aspect of the disclosed embodiments, the operation of at least two, optionally all, of the group of multiple electrical consumers is controlled, optionally regulated, and/or monitored by way of the converter.

According to one exemplary embodiment, the method is configured such that it implements the air supply system according to one of the above aspects or exemplary embodiments.

In the following description of exemplary embodiments, an air supply system according to the disclosed embodiments is generally provided with reference numeral 1. It is clear that FIGS. 1 and 2 represent only sections of an air supply system 1, that is to say only some of the group of electrical consumers assigned to the air supply system.

Figure 2:
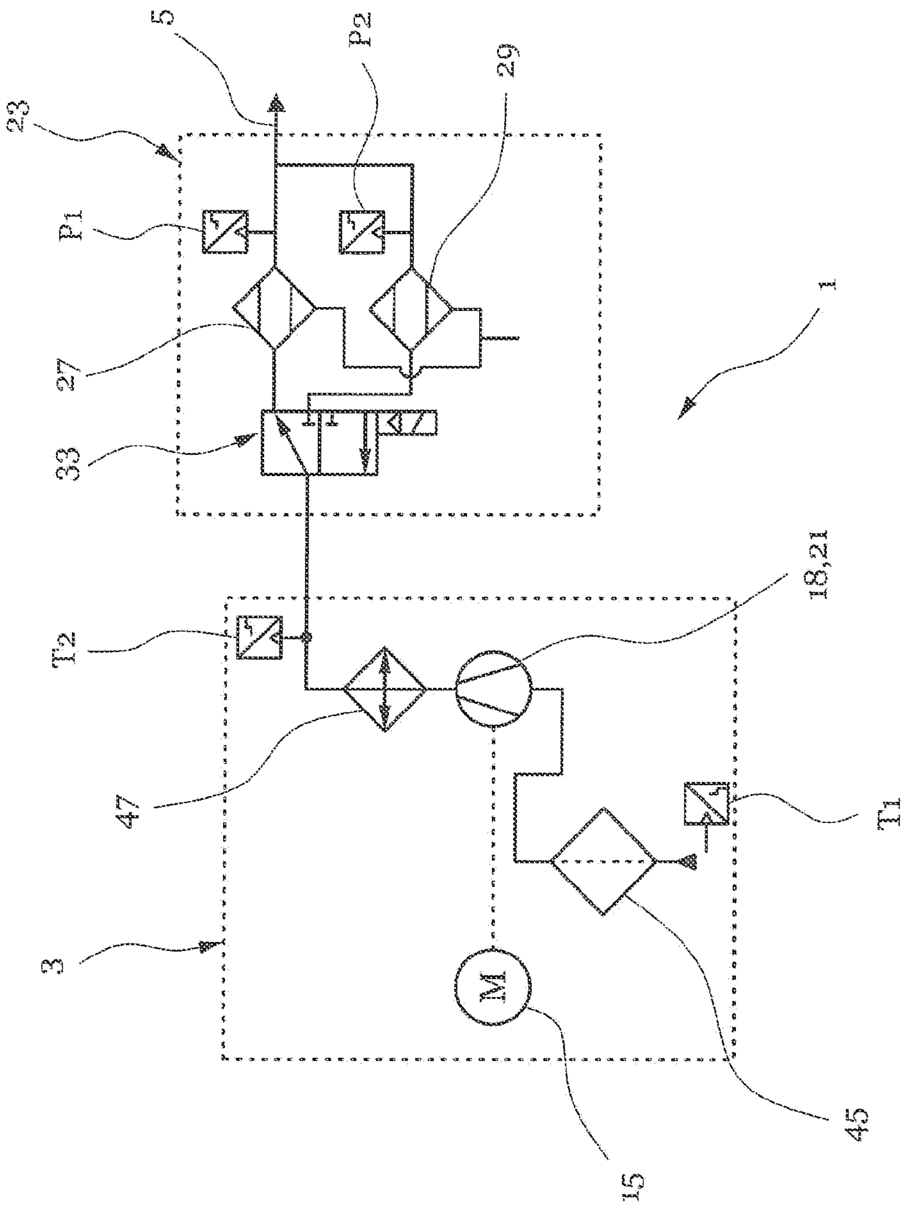
FIG. 2 shows a detail of the block circuit diagram according to FIG. 1.

In the exemplary block diagram according to FIG. 1, a group of multiple electrical consumers are connected next to one another in series, viewed from left to right in FIG. 1, which corresponds to a flow direction of air, in particular compressed air, and/or an air circulation direction, depicted starting with compressed air generation 3 and going to compressed air output 5. A converter 7 coupled to a power supply (not shown in more detail) of the rail vehicle for matching the voltage and/or frequency provided by the power supply to an operating voltage and/or operating frequency of at least one electrical consumer of the group of multiple electrical consumers, in particular connected in series, with which the respective electrical consumer is to be operated, is coupled to a power supply line 9, in particular the main power supply at approximately 400 VAC or 680 VDC. The converter 7 is coupled to an electrical energy source (not shown in more detail), such as a battery or accumulator, via a battery supply line 11 (24 V to 110 V) that serves to supply energy to the converter electronics and its subcomponents. The converter 7 converts the voltage and/or frequency of the main power supply line 9 in accordance with a desired and/or predefined operating mode and/or a speed of a compressor, wherein the converted voltage and/or frequency is provided to a compressor motor 15 via a supply line 17 shown schematically in FIG. 1. The converter 7 is furthermore coupled to the electrical energy source (not shown), such as a battery or accumulator, via an energy supply line 13, in particular in order to briefly provide air for a pantograph, not shown in more detail, in an auxiliary operating mode (96 to 110 V).

As further electrical consumers, a blower 19, a low-pressure section 18, a high-pressure section 21 and an air dryer 23, from which the compressed air output line 5 is provided, are connected in series viewed from left to right in FIG. 1, that is to say in the airflow direction. A venting valve 25 is optionally arranged between the low-pressure section 18 and the high-pressure section 21 and is supplied with electrical energy via the energy supply from the electrical energy source by way of the supply line 17. The air dryer 23 is configured for example as an absorption regeneration dryer and has two compressed air reservoirs 27, 29 connected in parallel. The two compressed air reservoirs 27, 29 are in this case integrated into the compressed air generation and purification process such that one compressed air reservoir 27, 29 performs an air drying process, while the other compressed air reservoir 29, 79 carries out a regeneration process. The compressed air reservoirs 27, 29 are changed or switched back and forth between the two compressed air reservoirs 27, 29 via a switching valve 33 that is assigned to the two compressed air reservoirs 27, 29. A regeneration control valve 31 may interact with the switching valve 33 in order to control the air dryer operation.

The converter 7 has electronics that are indicated schematically in FIG. 1 by the block diagram with the reference numeral 35 and that may have a storage unit for storing data. FIG. 1 shows that the converter is assigned to all of the electronic consumers shown in FIG. 1, specifically the compressor motor 15, the blower 19, the valves 25, 31 and 33 and the air dryer 23, such that the converter is able to control, regulate and/or monitor their operation. For this purpose, provision is made for schematically shown control and/or sensor lines 37, by way of which the converter 7 is connected to the electronic consumers 15, 19, 25, 31, 33, 23, it being clear that the converter 7 has appropriate signal outputs and the electrical loads 15, 19, 95, 31, 33, 23 have appropriate signal inputs. The converter 7 is connected to the electronic consumers in terms of signal transmission via the sensor lines and/or control lines 37 in order to control, to regulate and/or to monitor their operation, for example based on a compressor speed and/or based on a predefined operating mode and/or an operating mode predefined by superordinate electronics (not shown). To this end, the converter 7 connects through the current received from the electrical energy source by way of the supply line 9, 11, 13 in order to activate or to deactivate the respective electronic consumers. The sensor lines and/or control lines 37 may be configured as an NTC resistor or have an NTC resistor (not shown), the measured values of which are monitored by the converter 7, in particular in order to control, to regulate and/or to monitor the operation of the respective electronic consumers or air supply system 1. By way of example, the converter monitors the NTC resistors assigned to the heating cartridges of the air dryer 23, and accordingly the ascertained temperature values, for example of the dryer housing, the surroundings, the cooling air and/or the conveyed compressed air, in order to activate/to deactivate the heating cartridge. This is in turn performed by connecting through the current received from the electrical energy source by way of the energy supply line 11.

The converter 7 is furthermore coupled to a control input line 39, via which the converter 7 is able to receive a control command from superordinate electronics (not shown), such as a vehicle controller or brake controller, which control command contains information about the operating state and/or the compressor speed that the converter 7 has to set in the air supply system 1.

Provision may furthermore be made for one or more sensors (not shown) for ascertaining an air-specific measured variable, such as temperature, pressure, air humidity or the like, a consumer-specific measured variable, such as operating pressure, temperature, wear, input or output power, or an operating parameter of the converter 7, such as voltage or temperature, said sensors being connected to the converter 7 in terms of signal transmission by way of a sensor line 41. It is clear that the converter 7 has appropriately configured and configured signal inputs. The converter 7 may accordingly also be configured to control, to regulate and/or to monitor the operation of the air supply system based on the ascertained sensor measured data. The converter 7 furthermore has an Ethernet or CAN interface 43, which may be configured for example as a diagnostic interface for transmitting the measured data, in particular diagnostic data, from the air supply system 1 to the superordinate electronics, or as a communication interface for transmitting measured data or diagnostic data and for receiving control signals. The converter electronics may also have a prepared interface for an adapter card, using which further communication protocols may be implemented (for example MVB, Dual CAN, Ethernet TRDP, Profinet or the like). The converter may then be configured so as to control, in particular to regulate, the operation of the air dryer 23 based on the compressor speed. By way of example, the converter 7 may control, in particular regulate, the operation of the air dryer 23 such that a regeneration air loss when switching between the two compressed air reservoirs 27, 29 is minimized and/or optimized.

The functionality of the air supply system 1 is explained by way of example with reference to FIG. 2, which shows a detail of a block diagram of an air supply unit 1, with only the compressor 3 and the air dryer 23 being shown according to the block diagram. The compressor 3 comprises the motor 15, as well as the low-pressure section 18 and the high-pressure section 21 that were already shown in FIG. 1. FIG. 2 also additionally shows an air inlet or suction filter 45 from which the air passes into the low-pressure or high-pressure section 18, 21. Downstream of the high-pressure or low-pressure sections 18, 21, provision is made for an aftercooler 47 for cooling down the compressed air. A temperature sensor T1 for measuring the air input temperature or the ambient temperature is located at the air input area 45, this temperature corresponding to the cooling air temperature, and, downstream of the aftercooler 47, provision is made for a second temperature sensor T2 for measuring the temperature of the cooled compression gas. As already described, the air dryer 23 contains the switching valve 33, two air pressure reservoirs 27, 29 connected in parallel and two pressure sensors p1, p2, each assigned to one of the compressed air reservoirs 27, 29, for measuring the respective prevailing pressure in the reservoir 27, 29 (the regeneration air control valve is not shown in this variant). The temperature sensor T1 may for example be configured to measure an ambient temperature, for example at the air inlet area 45. Provision may be made for a temperature value T1 of less than 50° C. to be ascertained as setpoint operation, while faulty operation is present if the temperature value T1 is greater than 50° C. for a period of around 10 minutes. The converter 7 is configured to ascertain the measured temperature values from the temperature sensor T1 and to control, in particular to regulate, and/or to monitor the operation of the air supply system 1, in particular of the compressor 3, based on the measured temperature values. By way of example, the converter 7 may output an alarm that indicates faulty operation and/or triggers a maintenance measure. The converter 7 may furthermore be configured so as to monitor the pressure values ascertained by the pressure sensors p1, p2, wherein the converter 7 may be configured such that, 10 seconds after the compressor 3 has been activated, the pressure value p1 or p2 should be greater, such that it is possible to conclude as to faulty operation in the case of a pressure value p1, p2 of less than 5 bar. The converter 7 is furthermore configured so as to recognize faulty operation if one of the pressure values p1(T) or p2(T) is greater than 11 bar. According to a further exemplary embodiment, the converter 7 may be configured so as to monitor a temperature difference between the two temperature sensors T1, T2, wherein a temperature difference of less than 20° indicates setpoint operation, while a temperature difference of more than 20° indicates faulty operation. The converter 7 may furthermore be configured so as to monitor the generation and conveying of compressed air. Setpoint operation may be present in this case when the pressure gradient p1(T) or p2(T) is greater than or equal to 0.8 times a predetermined reference value, optionally transmitted by the superordinate electronics. Faulty operation may also be present when p1(T) or p2(T) is less than 0.8 times the reference value.

According to a further embodiment, not shown, a pressure sensor may be assigned to the compressor 15. If the compressor 3 receives a start control signal from the converter 7, but the pressure sensor does not detect any, optionally no significant, change in pressure, in particular in comparison with the initial setting or the non-actuated state, the converter 7 may identify faulty operation of the compressor 3. The at least one sensor T2 or p2 may furthermore be assigned to the air dryer 23, and in particular to its air reservoirs 27, 29, in order to ascertain their pressure value. The converter 7 is configured so as to compare the one or more ascertained pressure values with one another and/or with predefined, expected pressure values for the respective operating state and to identify a faulty operating state of the air dryer 23 if a deviation is present, in particular a deviation that exceeds more than a tolerance. The converter 7 may be configured so as to monitor a cooling state of the air supply system 1 by monitoring the cooling air temperature and/or the ambient temperature. In a further exemplary embodiment, the sensor, for example T1, determines a temperature difference between a compressor input or the ambient air and a compressor output, based on which the converter 7 is able to monitor the cooling state of the compressor 3, in particular of the air supply system 1. By way of example, the converter 7 is configured so as to establish a faulty operating state of the compressor 3 if the ascertained temperature difference is excessively high. The at least one sensor may furthermore determine a pressure difference at the input side and at the output side of an input filter (not shown in more detail) of the compressor 3. By way of example, the converter 7 is configured so as to compare the ascertained differential pressure with a limit value, based on which the converter 7 is able to establish whether the input filter is defective, in particular blocked. The converter 7 may furthermore be configured so as to identify whether the input filter, and thus the compressor 3, exhibits a degree of saturation/wear based on the differential pressure at the input side and at the output side of the input filter and, if necessary, to initiate maintenance measures. In a further example, the at least one sensor, for example T2, may ascertain the compressed air temperature and the converter 7 may control, in particular regulate, and/or optimize the operating cycle of the air dryer 23. By way of example, the converter 7 may be configured so as to analyze an air output capacity of the compressor 3 based on a pressure gradient of the compressor 3 and/or of the air dryer 23 in order also to determine for example wear and/or efficiency of the compressor 3.

The features disclosed in the above description, the figures and the claims may be significant both on their own and in any combination for implementing the various embodiments.

LIST OF REFERENCE SIGNS

1 Air supply system
3 Compressed air generation
5 Compressed air output
7 Converter
9 Main power supply line
11, 13 Energy supply line
15 Motor
17 Supply line
18 Low-pressure section
19 Blower
21 High-pressure section
23 Air dryer
25 Venting valve
27, 29 Air reservoir
31 Regeneration control valve
33 Switching valve
35 Electronics
37 Sensor line
39 Control input line
41 Sensor line
43 Interface
45 Air input area
47 Aftercooler
$p_1$, $p_2$ Pressure sensor
$T_1$, $T_2$ Temperature sensor

The invention claimed is:

1. An air supply system for a rail vehicle, the air supply system comprising:

a plurality of electrical consumers arranged in series in a direction of airflow including at least a compressor, an air dryer, and a valve; and a converter coupled to a power supply of the rail vehicle and configured to match a voltage and/or frequency provided by the power supply to an operating voltage and/or operating frequency of the plurality of electrical consumers and output the matched operating voltage and/or frequency for each of the plurality of electrical consumers with which the electrical consumer is to be operated via a supply line, wherein the converter is assigned to the plurality of electrical consumers such that the converter controls, via closed-loop control without further intervening electronic controllers for processing a signal from the converter, the operation of the plurality of electrical consumers via regulation and monitoring and includes an input interface for transmitting sensed data from the plurality of electrical consumers to superordinate electronics.

2. The air supply system of claim 1, wherein the converter includes electronics that are:

configured to convert the voltage and/or frequency provided by the power supply to the operating voltage and/or operating frequency of the plurality of electrical consumers, and/or connected to at least two of the plurality of electrical consumers such that the electronics control and/or monitor operation the at least two electrical consumers based on control algorithms stored in the electronics and/or of control signals received from superordinate electronics including a vehicle controller, to regulate the at least two electrical consumers based on the-control algorithms stored in the electronics and/or of regulation signals received from the superordinate electronics.

3. The air supply system of claim 1, further comprising at least one sensor for ascertaining an air-specific measured variable and/or for ascertaining a consumer-specific measured variable, and/or for ascertaining an operating parameter of the converter, wherein the at least one sensor is arranged and/or assigned to at least one of the plurality of electrical consumers.

4. The air supply system of claim 3, wherein the air-specific measured variable is one of temperature, pressure, and air humidity, the consumer-specific measured variable is one of operating hours, temperature, wear, and input or output power, and the operating parameter is one of voltage or temperature.

5. The air supply system of claim 3, wherein the converter is configured to adapt the operation of at least one of the plurality of electrical consumers based on the received measured air-specific and/or consumer-specific variable-based on comparison between the received measured air-specific and/or consumer-specific variable and the setpoint variable assigned thereto in response to a faulty operating state of the at least one of the plurality of electrical consumers, including at least one of switching to emergency operation, deactivation or providing warning signals to superordinate electronics, and/or initiating maintenance measures.

6. The air supply system of claim 3, wherein the at least one sensor is configured to measure:

an upstream input pressure and/or a downstream output pressure, of a compressor, and/or a differential pressure or an upstream input pressure and/or a downstream output pressure, of an upstream input filter of the compressor, and/or a reservoir pressure or an upstream input pressure and/or a downstream output pressure, of an air dryer, and/or an ambient temperature, a cooling air temperature or a downstream output temperature, of the air dryer or of a compressor motor of the compressor, and/or a degree of presence of oil particles or moisture in the air.

7. The air supply system of claim 3, wherein the converter is configured to regulate operation of heater subcomponents of at least one heater of the air dryer based on temperature values ascertained by the at least one sensor and/or a time specification and/or a heating time, and/or to regulate a venting device for venting the compressor and/or an idling device for operating the compressor in idling mode based on a time value and/or a temperature value.

8. The air supply system of claim 3, wherein the input interface is configured for receiving the measured air-specific and/or consumer-specific variable and/or a storage unit for storing the received measured air-specific and/or consumer-specific variable and/or characteristic values resulting from processing of the measured air-specific and/or consumer-specific variables.

9. The air supply system of claim 8, wherein the converter is configured to monitor an operating state of at least one electrical consumer of the plurality of electrical consumers based on the received measured air-specific and/or consumer-specific variable, and to regulate operation of the at least one electrical consumer the received measured air-specific and/or consumer-specific variable.

10. The air supply system of claim 1, wherein the converter is configured regulate operation of an air dryer of the air supply system based on the compressor speed and/or ambient temperature and/or residual humidity of the air downstream of the air dryer to regulate the air dryer such that a regeneration air loss of the air dryer is minimized.

11. The air supply system of claim 8, wherein the storage unit stores setpoint variables for a setpoint operating state of at least one of the plurality of electrical consumers, wherein a respective measured air-specific and/or consumer-specific variable is assigned to a target variable of the at least one electrical consumer.

12. The air supply system of claim 8, wherein the converter comprises an evaluation unit for processing the received air-specific and/or consumer-specific measured variable, wherein the evaluation unit is configured to compare the received measured air-specific and/or consumer-specific variable with a setpoint variable assigned thereto for a setpoint operating state of at least one consumer.

13. The air supply system of claim 12, wherein the converter evaluation unit is configured to identify a faulty operating state of at least one of the plurality of electrical consumers based on comparison of the received measured air-specific and/or consumer-specific variable with the setpoint variable assigned thereto when the received measured air-specific and/or consumer-specific variable deviates from the setpoint variable assigned thereto, wherein the deviation exceeds a predefined tolerance deviation.

14. The air supply system of claim 1, wherein the converter is configured to generate an analog control signal for regulating, at least one of the plurality of electrical consumers.

15. The air supply system of claim 1, wherein the converter is connected to an additional electrical energy source including one of a battery and an accumulator that powers the air supply system in response to failure of the power supply.

16. A method for regulating and/or monitoring an air supply system comprising a plurality of electrical consumers including at least two of a compressor, an air dryer, and a valve arranged in series, and having a converter coupled to a power supply of a rail vehicle for matching a voltage and/or frequency provided by the power supply to an operating voltage and/or operating frequency of the at least two of the plurality of electrical consumers and outputting the matched operating voltage and/or frequency for each of the at least two of the plurality of electrical consumers, via closed-loop control without further intervening electronic controllers for processing a signal from the converter, with which the electrical consumer is to be operated, of a rail vehicle, wherein:

power is provided to the air supply system, the operating voltage and/or an operating frequency for operating the plurality of electrical consumers is generated from the power supply by way of the converter and output for via a supply line from the power supply, and the operation of the plurality electrical consumers is regulated, and/or monitored by way of the converter and includes an input interface for transmitting sensed data from the at least two of the plurality of electrical consumers to superordinate electronics.

17. The method of claim 16, wherein the converter converts the voltage and/or frequency provided by the power supply to the operating voltage and/or operating frequency of the at least two electrical consumers, and/or the converter controls and/or monitors operation of at least two of the plurality of electrical consumers based on control algorithms stored in electronics of the converter and/or of control signals received from the superordinate electronics including a vehicle controller.

18. The method of claim 16, further comprising ascertaining, by at least one sensor, an air-specific measured variable and/or a consumer-specific measured variable, and/or an operating parameter of the converter, wherein the at least one sensor is arranged and/or assigned to at least one of the plurality of electrical consumers.

19. The method of claim 18, wherein the at least one sensor measures:

an upstream input pressure and/or a downstream output pressure, of a compressor, and/or a differential pressure or an upstream input pressure and/or a downstream output pressure, of an upstream input filter of the compressor, and/or a reservoir pressure or an upstream input pressure and/or a downstream output pressure, of an air dryer, and/or an ambient temperature, a cooling air temperature or a downstream output temperature, of the air dryer or of a compressor motor of the compressor, and/or a degree of presence of oil particles or moisture in the air.

* * * * *